(12) United States Patent
Mailer

(10) Patent No.: US 6,876,920 B1
(45) Date of Patent: Apr. 5, 2005

(54) VEHICLE POSITIONING APPARATUS AND METHOD

(75) Inventor: Robert Lindsay Mailer, West End (AU)

(73) Assignee: Beeline Technologies Pty LTD (AU)

( * ) Notice: Subject to any disclaimer, the term of this patent is extended or adjusted under 35 U.S.C. 154(b) by 0 days.

(21) Appl. No.: 09/830,479

(22) PCT Filed: Oct. 27, 1999

(86) PCT No.: PCT/AU99/00930
§ 371 (c)(1),
(2), (4) Date: Aug. 8, 2001

(87) PCT Pub. No.: WO00/24239
PCT Pub. Date: May 4, 2000

(30) Foreign Application Priority Data

Oct. 27, 1998 (AU) .................................................. PP6795

(51) Int. Cl.⁷ ........................... G01C 21/00; G06G 7/78; A01D 34/00
(52) U.S. Cl. ........................... 701/207; 701/23; 342/457
(58) Field of Search ........................... 701/23, 207, 26, 701/41, 50, 213, 215, 226, 122, 214, 200, 224; 342/357.17, 357.03, 457, 46; 180/168; 172/3, 5, 26; 56/10.2 F

(56) References Cited

U.S. PATENT DOCUMENTS

| | | | | |
|---|---|---|---|---|
| 4,398,195 A | * | 8/1983 | Dano | 343/6.5 R |
| 4,558,760 A | * | 12/1985 | Lestradet | 180/169 |
| 4,706,773 A | * | 11/1987 | Reinaud | 180/169 |
| 4,939,663 A | * | 7/1990 | Baird | 364/449 |
| 4,967,362 A | * | 10/1990 | Schutten et al. | 364/424.07 |
| 5,019,990 A | * | 5/1991 | Kamimura et al. | 364/449 |
| 5,334,987 A | * | 8/1994 | Teach | 342/357 |
| 5,375,059 A | * | 12/1994 | Kyrtsos et al. | 364/449 |
| 5,928,309 A | * | 7/1999 | Korver et al. | 701/214 |
| 5,955,973 A | * | 9/1999 | Anderson | 340/988 |
| 5,987,383 A | * | 11/1999 | Keller et al. | 701/213 |
| 5,991,694 A | * | 11/1999 | Gudat et al. | 702/2 |
| 6,087,984 A | * | 7/2000 | Keller et al. | 342/357.17 |
| 6,199,000 B1 | * | 3/2001 | Keller et al. | 701/50 |
| 6,314,348 B1 | * | 11/2001 | Winslow | 701/23 |
| 6,400,143 B1 | * | 6/2002 | Travostino et al. | 324/207.22 |

FOREIGN PATENT DOCUMENTS

WO    WO 98/46065    10/1998

* cited by examiner

Primary Examiner—Tan Q. Nguyen
Assistant Examiner—Dalena Tran
(74) Attorney, Agent, or Firm—Gifford, Krass, Groh, Sprinkle, Anderson & Citkowski, P.C.

(57) ABSTRACT

There is disclosed a guidance assisting apparatus for aiding in the guidance of an agricultural vehicle (5) over arable land. The apparatus makes use of a GPS positional receiver (81) in order to determine if the vehicle (5) is overlapping previous passes of a paddock thereby reducing the likelihood of strips of land being double processed or left unprocessed. Guidance may be provided by a visual display or by power assisted steering.

8 Claims, 23 Drawing Sheets

Process User Input Routine

VEHICLE POSITIONING APPARATUS AND METHOD

FIELD OF THE INVENTION

The present invention is concerned with means and methods for increasing the efficiency of mechanised crop farming.

BACKGROUND OF THE INVENTION AND SURVEY OF PRIOR ART

Crop farming typically involves the sowing, fertilisation and harvesting of crop plants in a paddock. Modern day crop farming makes extensive use of automotive farm machinery, such as tractors, which are used to pull field-working implements, such as ploughs or fertilising rigs etc. The width of the field-working implement is generally greater than the width of the tractor. In operation the tractor is driven up and down the paddock in passes which follow parallel lines. However if the passes are too close together, that is closer than the working width of the implement, then a problem arises in that over consecutive passes the implement is partially back over a strip of paddock processed during the last pass. Hence an undesirable overlap occurs. Alternatively, if the passes are too far apart then another problem arises in that a strip of unprocessed paddock is left between consecutive passes of the implement.

Consequently it is desirable that the tractor passes up and down the field along lines which are parallel and offset from each other by approximately the working width of the implement being towed. Adhering to such a strategy results in savings in the amount of fuel used to power the vehicle as the number of passes required to process a given area is reduced. Savings are also made in the amount of pesticides, machinery wear and tear and labour expended in processing a given area.

However, ensuring that the offset between consecutive passes of the tractor is continuously maintained equal to the working width of the implement requires the exercise of skill and endurance by the driver of the tractor. Factors such as varying seasonal conditions, undulating terrain, driver fatigue and such like may result in the driver inaccurately estimating the correct starting point of a pass, so that the offset from an adjacent pass is incorrect, or may result in the vehicle being driven non-parallel to the first pass. As a result overlap or separation between the areas processed during consecutive passes of the vehicle up and down the paddock may occur.

In U.S. Pat. No. 4,515,221 there is described a guidance system for a tractor which makes use of a gyroscopic system to monitor the direction of motion of an agricultural vehicle. However the invention requires that the gyroscopic system maintains a platform, on which two accelerometers are mounted, in perfectly horizontal disposition and so is technically difficult to implement and lacking in ruggedness and accuracy.

In U.S. Pat. No. 5,938,709 there is described a field mapping system for an agricultural vehicle, however the system does not directly aid in addressing the problem of maintaining a correct offset between consecutive passes of an agricultural vehicle as described above.

It is an object of the present invention to provide a system for aiding in the navigation of an agricultural vehicle so that consecutive passes of the vehicle are optimally offset.

SUMMARY OF THE INVENTION

The present invention provides a guidance assist system which is mounted to a tractor or other agricultural vehicle and which assists in directing the tractor back and forth about a paddock in passes that are parallel to each other and are offset from each other by a distance which is settable by the driver and which is typically the working width of an implement towed by the tractor. The passes may be straight lines or alternatively they may be concentric polygons.

Accordingly, the system is built around a microprocessor and includes a data entry means coupled thereto. The data entry means allows the driver to enter data indicating a wayline or waypolygon, with respect to which it is desired that passes of the vehicle will be parallel, and also the distance through which consecutive passes of the vehicle should be offset. The system further includes a position sensing means, which provides data to the microprocessor concerning the position of the tractor at time intervals as the tractor moves across the field. The microprocessor is programmed to determine if the tractor is moving in the desired direction and if it is offset the correct amount from the previous pass. In the event that the tractor is not moving correctly then a guidance means is activated which assists in correcting the course of the tractor. In one embodiment the guidance means is a visual display which displays the deviation from the desired course in a manner which assists the driver of the tractor in returning the tractor to its desired course. In a further embodiment the guidance assist system includes servomotors which are coupled to the steering assembly of the tractor and which are controlled by the microprocessor in order to steer the tractor back to the desired path with minimal intervention required from the driver.

According to the present invention there is provided a vehicle guidance apparatus for guiding an agricultural vehicle over a paddock along a number of paths, the paths being offset from each other by a predetermined distance, said vehicle including steering means, said apparatus including:

a) position determining means arranged to generate vehicle position data;

b) data entry means facilitating entry of an initial path by an operator and a desired offset distance between paths;

c) processing means coupled to said position determining means and operatively arranged to generate said paths based on said initial path, said processing means generating a guidance signal indicative of errors in the position of the vehicle relative to one of said paths;

d) guidance means coupled to said microprocessor and arranged to aid in guiding said vehicle thereby reducing said errors.

Preferably said microprocessor is further operatively arranged to provide an indication of the direction of said vehicle relative to a path closest to said vehicle.

Preferably said paths are straight parallel lines.

Alternatively said paths may be concentric polygons

It is preferred that said position determining means includes a satellite based geographical positioning system receiver and a radio modem operatively receiving positional correction factor data. Preferably Differential GPS is used to provide the positioning data.

In one embodiment the guidance means comprises a human interface means for converting said guidance signal to a format indicating said error to a human operator of said vehicle.

Alternatively, or in addition to the human interface means, the guidance means may comprise a controllable steering means coupled to said processing means and arranged to steer said vehicle in a direction reducing said error.

In order to improve the positional data accuracy it is preferred that said position determining means includes relative position determining means mountable to said vehicle, said relative position determining means generating positional data signals indicative of the position of said vehicle, said microprocessor being responsive to said positional data signals.

In one embodiment said relative position determining means comprises a number of accelerometers.

Typically the controllable steering means includes at least one solenoid mechanically coupled to said steering means, said solenoid responsive to said guidance signal.

Preferably steerage feedback sensors operative to generate steerage feedback signals indicative of orientation of said steerable wheels or tracks, said microprocessor being responsive to said steerage feedback signals. The steerage feedback sensors may for example comprise Hall effect devices.

Preferably the radio modem is capable of bidirectional communication with a base station in order that data concerning the performance of the vehicle and apparatus may be transmitted back to the base station for logging and later examination.

BRIEF DESCRIPTION OF THE DRAWINGS

In order that the invention may be more readily understood and put into practical effect, reference will now be made to the preferred embodiments described in relation to the accompanying drawings wherein.

DETAILED DESCRIPTION OF THE INVENTION

Figure 1:
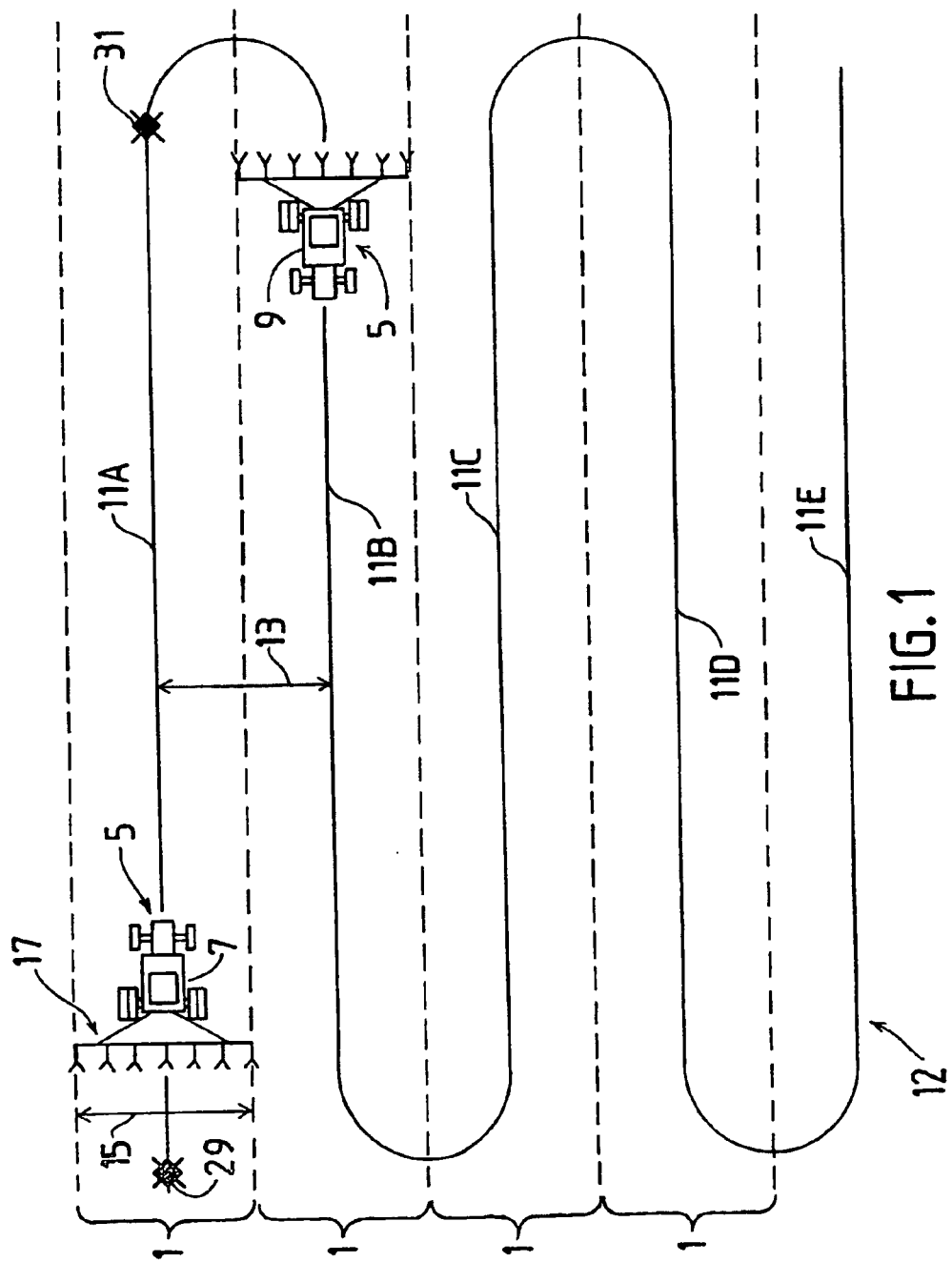
FIG. 1 depicts a plan view of a paddock with a tractor towing a field-working implement, shown at two positions, along an open ended path.

With reference to FIG. 1, there is depicted a plan view of a paddock including parallel rows 1 produced by passes of tractor 5 back and forth across the paddock. It is desired that tractor 5, shown at positions 7 and 9 travels back and forth across the paddock along path 12. It will be noted that the straight-line segments, or "waylines" 11A–11E of path 12 are all parallel and are offset from each other a distance 13 which is identical to the working width 15 of implement 17.

By offsetting waylines 11A–11E from each other by the working width of the implement, consecutive passes of the implement do not overlap each other nor is there a strip of unprocessed paddock left between adjacent rows.

Figure 2:
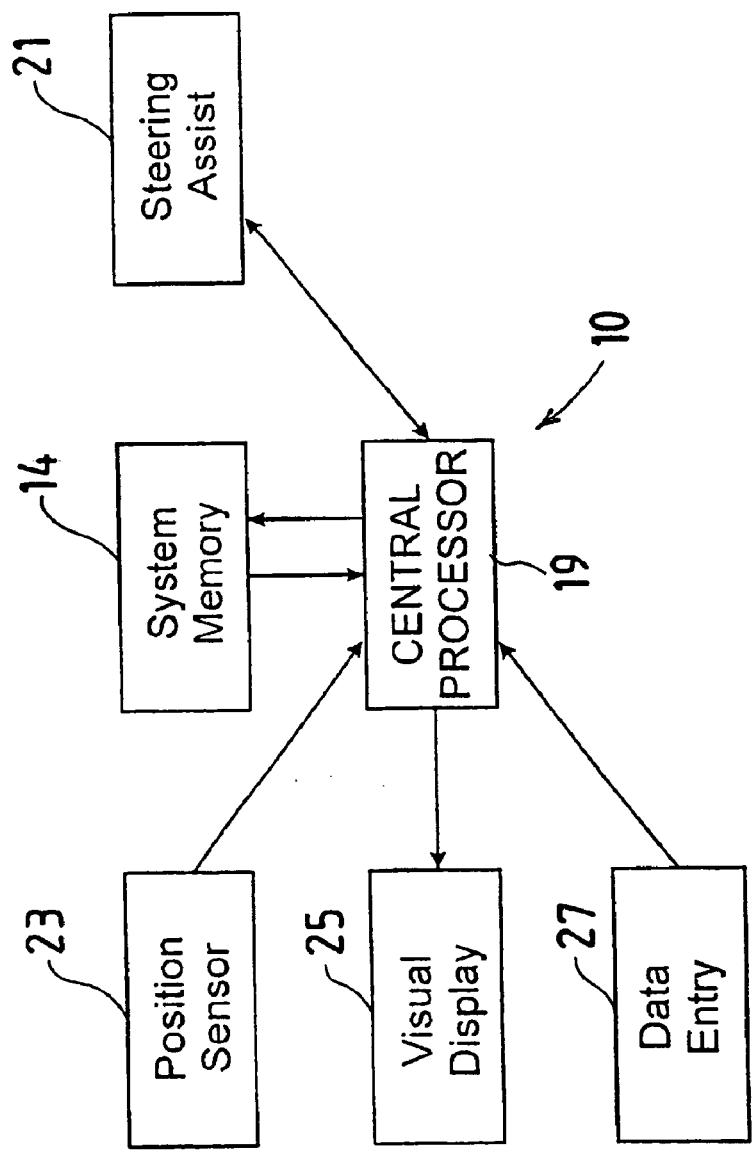
FIG. 2 depicts a block diagram of an agricultural vehicle guidance assist system according to an embodiment of the present invention.

Referring now to FIG. 2 there is depicted a schematic representation of the basic elements of a guidance assist system 10 according to an embodiment of the present invention. Guidance assist system 10 is intended for incorporation into an agricultural vehicle such as tractor 5.

Guidance assist system 10 includes a central processor 19 which is coupled to a position sensor 23, visual display 25, data entry unit 27 and optionally a mechanised steering assist unit 21. A program for execution by processor 19 is stored in system memory 14.

The function of each of the above components will now be described. Position sensor 23 provides data to processor 19 at constant intervals. The data dynamically specifies the position sensor's, and hence, because guidance assist system 10 is operatively mounted to tractor 5, the tractor's position as it moves back and forth across the field.

Visual display 25 displays a representation of the tractor's extrapolated path relative to current wayline down which it is desired that the tractor be travelling. The representation is frequently updated and may be referred to, by the driver of the tractor, as an aid in reducing deviation of the tractor from the current wayline.

Data entry unit 27 allows an operator to input parameters, such two points defining a first wayline and the working width 15 of implement 17 to processor 19.

The system 10 may further, or as an alternative to visual display 25, include a guidance aid in the form of steering assist unit 21 which includes servomotors for mechanically steering the vehicle under control of microprocessor 19. The steering assist unit further includes sensors, which transmit data concerning the orientation of the tractor's steering assembly back to processor 19.

Central processor 19 monitors position data from position sensor 23 and determines discrepancies between the actual path of tractor 5 and the current wayline segment that is intended to be followed. A representation of the difference between the desired path and the actual path is displayed by means of visual display 25 and may be referred to by the operator of the tractor so that the operator may steer the tractor in a direction that reduces the discrepancy. In conjunction with the production of the guidance display, processor 19 also sends commands to actuators of steering assist 21, which mechanically steer the tractor so as to reduce the discrepancy. Sensors in the steering assist module monitor the angle of the steering wheels of tractor 5 and feed the data back to processor 19 thereby allowing processor 19 to correct for understeering or oversteering.

The operation of the system will now be explained with reference to FIG. 1. Initially the driver of tractor 5 drives the tractor to a position which will be a first waypoint 29 for defining wayline 11A. Once at waypoint 29 the data entry means is used to inform processor 19 that the waypoint has been reached. Processor 19 then downloads the position of the tractor from position sensor 23 and records this value as waypoint A. The vehicle is then driven to a second waypoint 31 and that position is recorded as waypoint B. The direction vector pointing from waypoint A to waypoint B is referred to as a wayline.

In order to enter implement width 15 the operator firstly measures the width, for example with a tape measure, and then inputs the measured value to central processor 19 by means of data entry means 27.

Once the waypoint and implement width data has been entered the tractor is driven to wherever the operator wishes to commence the first run. The data entry means is then used to inform central processor 19 that the operator desires an indication of the offset of the vehicle's present location from the nearest wayline. Processor 19 calculates the locations of each of waylines 11A–11E, determining the one closest to the tractor. A representation of the relative positions of the closest wayline and of the tractor is generated by means of visual display 25. The operator of the tractor then drives to a point on the closest wayline and commences travelling down the line. As the driver moves down the line visual display 25 provides a visual guidance screen as shown in FIG. 3.

Figure 3:
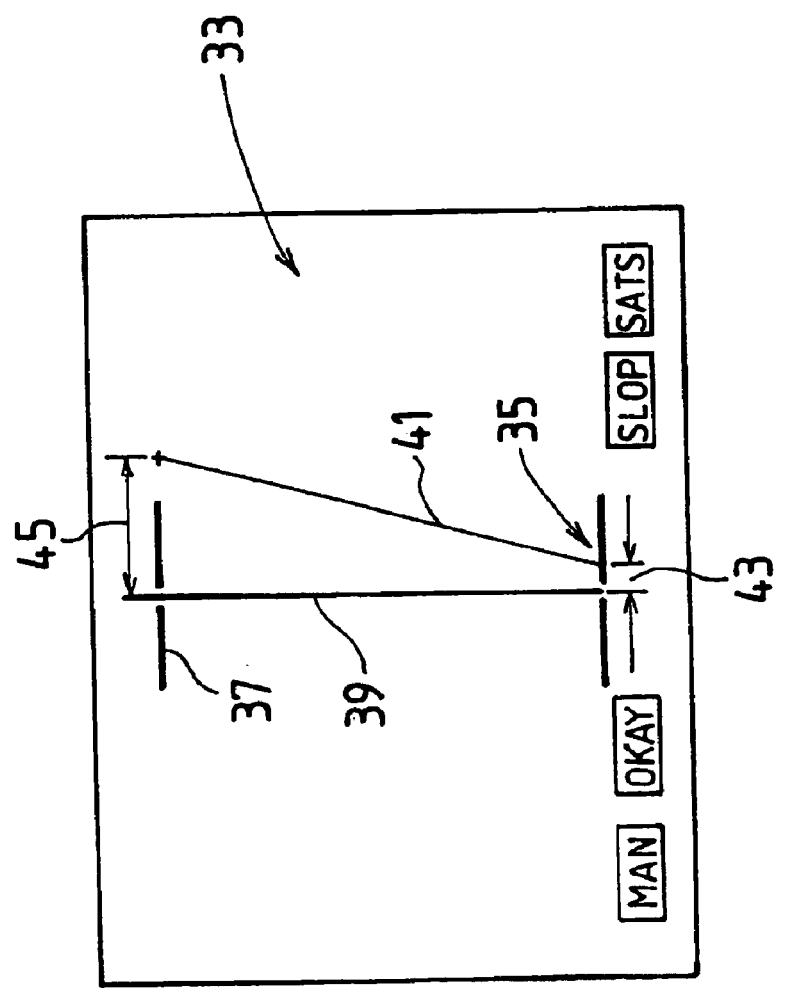
FIG. 3 depicts a screen of a visual display according to an embodiment of the invention.

With reference to FIG. 3 there is depicted a typical image from the guidance screen 33 displayed by visual display 25. At the bottom of screen 33 there is a small horizontal line 35 having a central gap. At the top of screen 33 is a similar line 37. Angled line 41 represents the extrapolated direction of travel of tractor 5. The distance 43 between the intersection of line 41 and line 35 is proportional to the current offset of tractor 5 from the present wayline as represented by vertical line 39. The distance 45, between the end of line 41 and the end of line 39, is proportional to the offset of tractor 5 from the desired line of travel 39 when the present course of tractor 5 is extrapolated 15m ahead.

By referring to the guidance screen 33 the driver of tractor 5 is able to steer so as to bring line 41 as closely as possible into coincidence with line 39. If steering assist module 21 is fitted to tractor 5 then the assist module, under command of processor 19 will continually act to bring line 41 into coincidence with line 39.

Figure 3A:
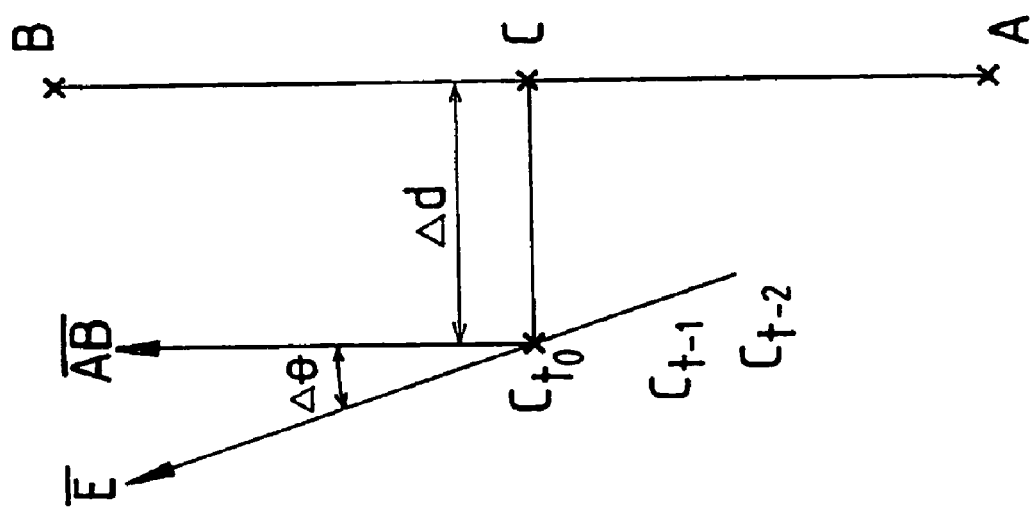
FIG. 3A is a diagram of the position of an agricultural vehicle relative to a wayline.

Referring now to FIG. 3A the offset and angular deviation displayed on the screen of FIG. 3 is calculated as follows. Firstly wayline AB has associated with it a direction vector AB. The direction vector of tractor 5 is E and is calculated by tracking the position of the tractor over past time periods. $C_{1-2}$, $C_{1-1}$ up to $C_{t0}$. Since points A and B are either the original waypoints entered by the operator of the guidance system, or are new waypoints generated by the system from the offset data, then in either case their coordinates are known. Consequently vector AB is readily calculated as is $\Delta\theta$. The distance ad from the present position, $C_{t0}$ of tractor 5, to $C_m$ the closest point on wayline AB, may be calculated using straightforward vector mathematics. However, that approach does not take into account the curvature of the earth from $C_{t0}$ to $C_m$ which is preferable. In order to take the curvature into account the microprocessor is programmed to iterate Vincenty's formulae, which allow for the calculation of accurate geodetic positions, azimuths and distances on the ellipsoid. The reader is referred to Vincenty's paper "Direct and inverse solutions of geodesics on the ellipsoid with application of nested equations" in Survey Review XII, 176, April 1975 for further information on the details of the calculation.

Figure 4:
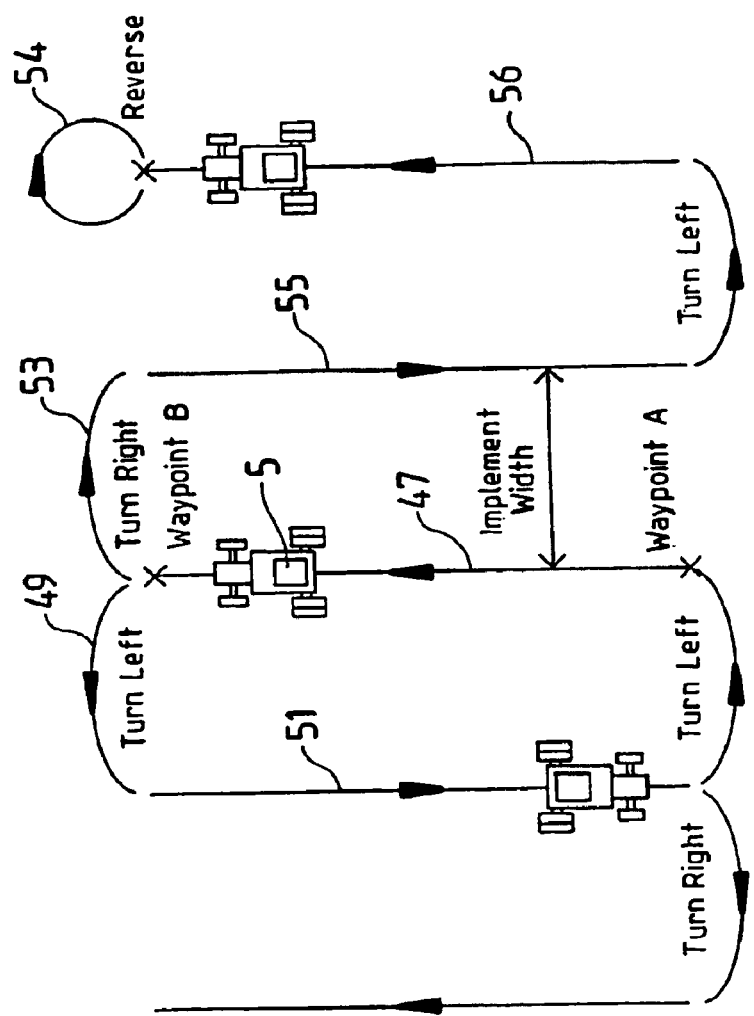
FIG. 4 is a diagram showing the turns that may be made by an agricultural vehicle in moving from one wayline to another.

With reference to FIG. 4, tractor 5 moves along wayline 47 in a direction from waypoint A to waypoint B. As the tractor nears the end of line segment 47 the operator indicates whether the tractor is to turn left, turn right or turn back on the wayline it has recently finished travelling along. The turn data is entered by means of data entry unit 27. In response to the entered turn data microprocessor 19 calculates the position of the next wayline to be followed and the direction that the tractor is to move along the wayline. For example, if the operator enters a turn left command as indicated by arc 49 then microprocessor 19 will set the current wayline to wayline 51 and will compare the positional data from position sensor 23 with wayline 51. Corresponding steering commands will be sent to steering assist unit 21 in the event that it is fitted. In contrast, if the operator enters a right turn command as indicated by arc 53, then microprocessor 19 will set line 39 of display 33 to track wayline 55 and will compare the positional data from position sensor 23 with a desired line segment corresponding to line 51. It may be that the operator wishes to pass back over the wayline which has just been followed, for example wayline 56. In that event the operator enters a "vehicle reverse" command as indicated by circle 54. In response microprocessor 19 changes the sign of the direction vector associated with wayline 56.

Figure 1A:
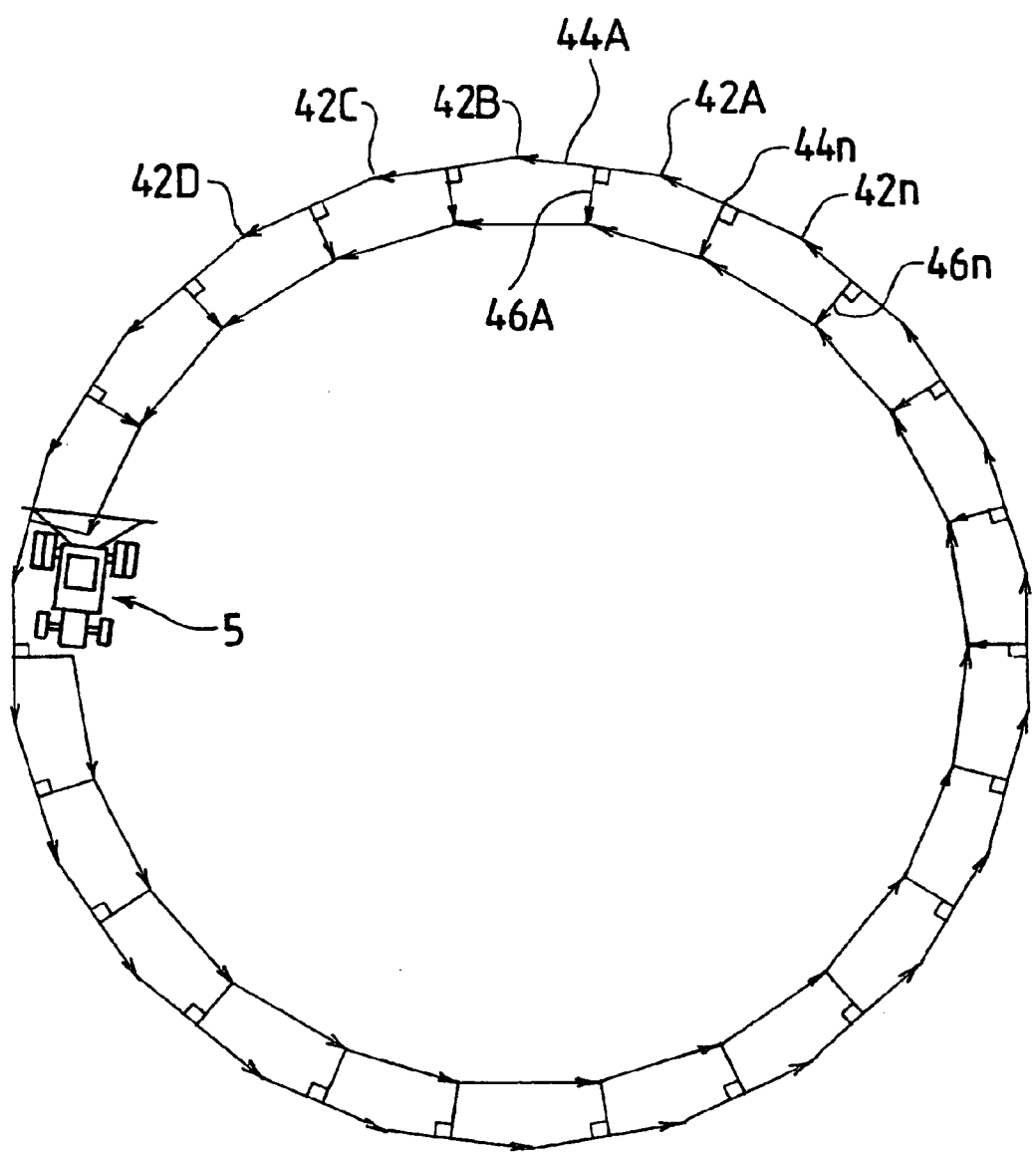
FIG. 1A depicts a plan view of a paddock with a tractor towing a field working implement along a closed path.

With reference to FIG. 1A there is depicted a plan view of a field in which tractor 5 follows a "wayline" formed by connecting a very large number of waypoints. The waylines are closed polygons defined by up to 1000 waypoints per kilometre. If this arrangement is used to guide tractor 5 then system 10 calculates a set of concentric waylines offset from each other by the working implement width entered by the operator of the system. This is done by connecting adjacent waypoints 42A, . . . ,42n with direction vectors 44A, . . . ,44n. The normal 46A, . . . ,46n to each direction vector is then calculated and the points 48A, . . . ,48n on the normal at a distance of half the implement width from the midpoint between adjacent waypoints is then located to form the second wayline or "waypolygon". Upon completing a waypolygon the operator of vehicle 5 indicates same to system 10 by means of data entry module 27. Microprocessor 19 is programmed to indicate, by means of visual display 25 the offset from the next inner (or outer) waypolygon. The driver then guides the vehicle, with the aid of steering assist module 21 if fitted, to the adjacent waypolygon and proceeds about it until the complete at which point the procedure is repeated in respect of the next concentrically located waypolygon.

Figure 5:
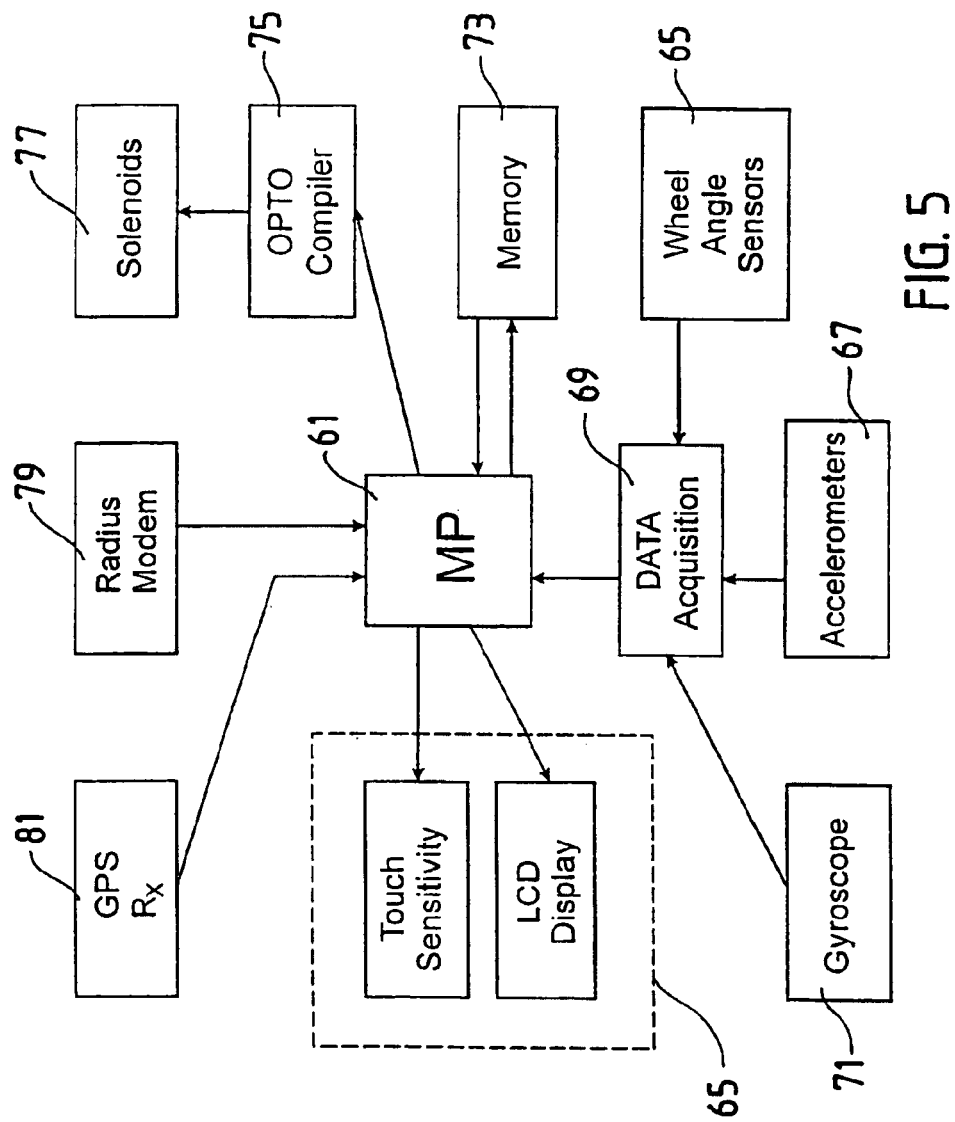
FIG. 5 depicts a block diagram of an agricultural vehicle guidance assist system according to a further embodiment of the present invention.

A preferred embodiment of the apparatus of FIG. 2 will now be described with reference to FIG. 5. With reference to FIG. 5 there is provided a processing means in the form of an IBM compatible microprocessor board 61. Processor board 61 is coupled to a LCD touch screen 63 which allows operator data entry and display of information such as that of the guidance screen shown in FIG. 3. Processor board 69 further receives data from geographical positioning system (GPS) receiver 81, and radio modem 79. As will be explained shortly, data from radio modem 79 is used to correct data output by GPS receiver 81. Processor 61 further receives data from accelerometers 67, wheel angle sensors 65 and gyroscope 71, all of which Is converted to a suitable digital format by data acquisition module 69. Pulse width modulated control signals from processor board 61 are transmitted to opto coupler board 75 which electrically isolates the microprocessor from the solenoids and converts the control signals into current signals suitable for solenoid operation. Solenoids 77, together with wheel angle sensors 65, form the steering assist module 21 of FIG. 2. System memory 73, stores a program which is operatively executed by microprocessor board 61 in order to effect the functioning of the overall system as previously described.

GPS receiver 81 is a commercially available unit being the Novotel Millenium Propack RT2 manufactured by Novotel Corp of Calgary Canada. Receiver 81 generates positional data on the basis of signals emanating from a network of twenty-seven satellites. The GPS system provides two separate transmissions; an extremely high accuracy military transmission, and a slightly degraded civilian transmission. The civilian transmission contains errors, which are intentionally introduced in order to lower the accuracy of the position data accessible to non-military personnel. However, it is known that by providing two GPS receivers in communication, one of which has a fixed and known location, such errors may be drastically reduced. One such system is known as Differential GPS (DGPS), a variation is Wide Angle Differential GPS, both are known in the prior art. Obviously, the fixed receiver cannot be located on tractor and so radio modem 79 is provided for receiving correction data from a base station. The base station processes data from a fixed receiver, of known location, and generates correctional data which computer 61 uses to adjust data from mobile GPS receiver 81.

Figure 6:
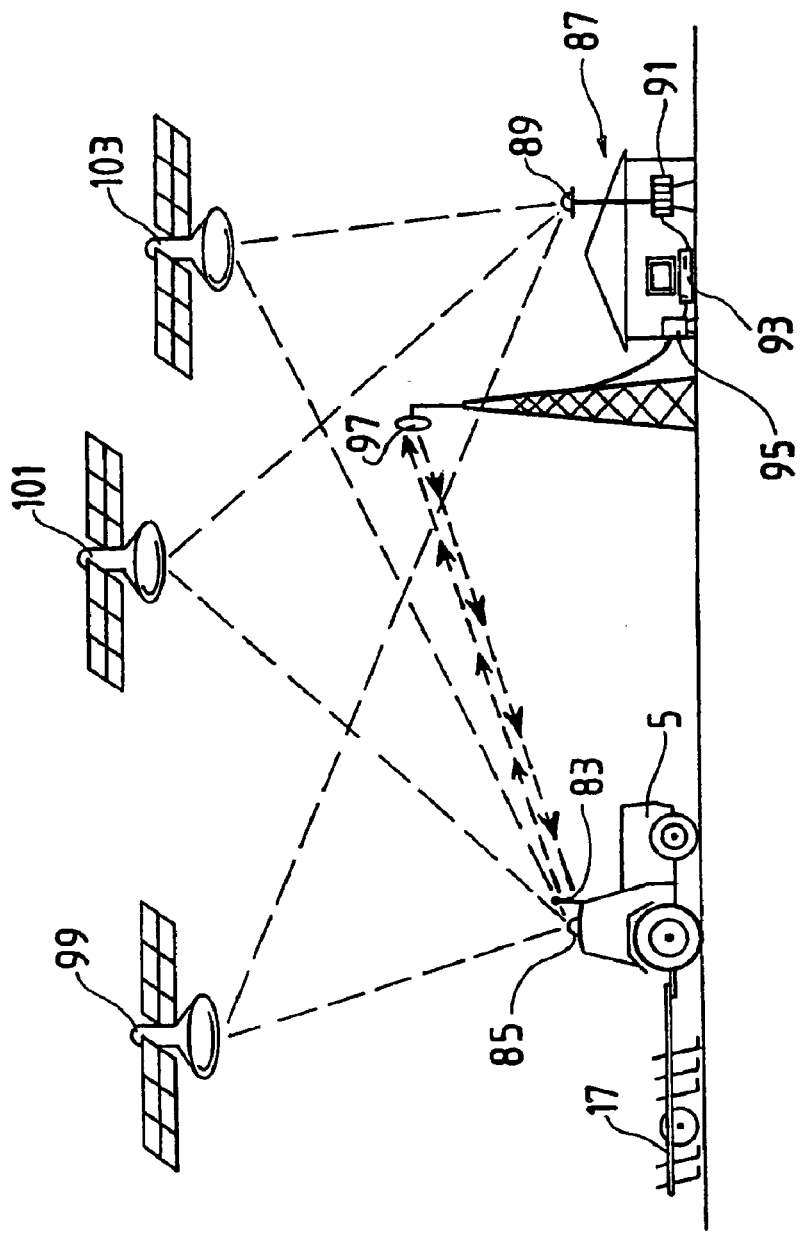
FIG. 6 is a schematic diagram of a Differential GPS position sensing system as incorporated into an embodiment of the invention.

With reference to FIG. 6 a differential GPS system is depicted. In that figure an agricultural vehicle, being tractor 5 tows an implement 17. Tractor 5 is fitted with the guidance system of FIG. 5, including radio modem 79, which is connected to UHF antenna 83. GPS receiver 81 is connected to satellite antenna 85, which is mounted on the roof of tractor 5. Base station 87 includes a satellite antenna which is connected to GPS receiver 91 and receives signals from orbiting GPS satelites 99, 101, 103. Receiver 91, on the basis of the signals coming from antenna 89 calculates and provides positional data to computer 93. The computer compares the positional data from receiver 91 with a predetermined and accurately known position for antenna 89. On the basis of the comparison computer 93 is able to calculate an error factor, which is continuously updated and passed to radio modem 95. Radio modem 95 generates a serial data signal which is upconverted to the UHF band and propagated by base antenna 97. The transmitted error signal is received by the UHF antenna 83 mounted on tractor 5. With reference to FIG. 5, radio modem 79 converts the received error factor signal into a digital format suitable for processing by microprocessor board 61. On the basis of the error factor the microprocessor, running a suitable program, is able to adjust the data from GPS receiver 81 in order to drastically increase the accuracy of the positional data obtained.

Accelerometers 67 are further used to increase the accuracy of the steering guidance system shown in FIG. 5. The accelerometers measure acceleration in three dimensions. Due to the limitations of current GPS technology, positional updates are only available once every 200 ms. During the time between updates positional values may vary significantly, negatively influencing the accuracy of the overall system during the intervening time. Data from accelerometers 67 is generated 150 times per second and is used by microprocessor 61 to calculate the relative change in position at a number of time points during the time between GPS updates. Consequently the incorporation of the accelerometers increases the accuracy of the positional data available when calculating the deviation of tractor 5 from the desired path. By making use of the accelerometers 67 in conjunction with the DGPS data the position of vehicle 5 may be determined to better than 2 cm accuracy at any given time.

The vehicle positioning apparatus of the preferred embodiment includes a steering control system based around a proportional-integral-differential (PID) controller which is modeled and effected in software stored in memory 73. Such systems are well known in classical and digital control theory and will not be discussed in detail here. The output of the PID controller is used to set a solenoid control variable which then determines the length and quantity of a series of pulses output to solenoids 77 in order to control the tractor's steering mechanism. Several external sensors are used to further refine the steering control system function being wheel angle sensors 65 and tilt sensing by means of gyroscope 71.

Figure 7:
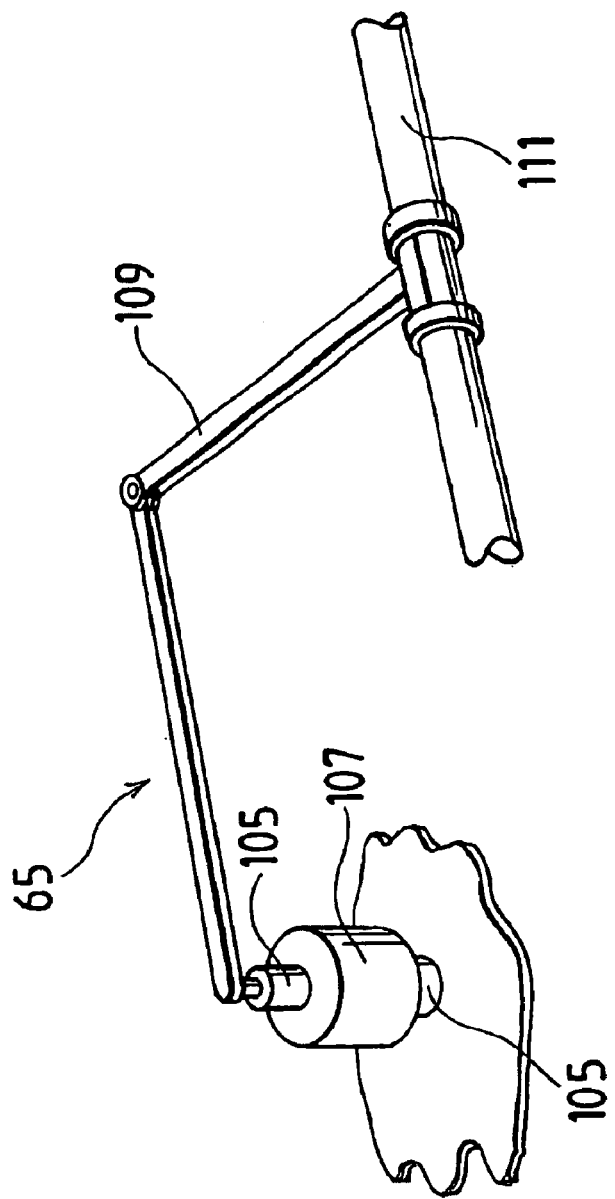
FIG. 7 depicts the coupling between a member of the steering assembly of an agricultural vehicle and a hall effect device used to monitor steering angle.

With reference to FIG. 7, wheel angle sensors 65 are used in the vehicle positioning apparatus of the preferred embodiment in order to determine the degree of steering of the tractor's steered wheels. The sensors are preferably based on the Hall effect and can accurately track small changes in magnetic flux density. The units are comprised of three major components, namely a sensor 105, a magnet 107 and mounting arm or mechanical linkage 109, which is mechanically coupled to steering arm 111 of the steering assembly of tractor 5.

As steering arm 111 moves to steer the steered wheels of tractor 5 to the left or right, sensor 105 rotates, by virtue of mechanical coupling to arm 111 within magnet 107, which is held stationary relative to arm 111. Relative motion of the sensor within magnet 107 causes a magnetic flux change. This change in flux is represented by a linear output relationship between the wheel angle and the signal voltage. The wheel angle sensors are supplied with a five volt (5V) and a ground (GND) supply. The input signal returned to the hardware module is proportional to the angle of rotation of the wheel and is of course limited to the supply voltage.

The vehicle positioning apparatus of the preferred embodiment also makes use of a gyroscope to measure tilt of the vehicle thereby further increasing the accuracy of the steering control system. The pitch (relative height of the front of the vehicle with respect to its rear) and roll (relative height of the leftmost side of the vehicle with respect to its rightmost side) of the vehicle to which it is attached are measured using both accelerometer 67 and gyroscope 71. The accelerometer is sensitive to forces lateral to the direction of motion whereas the rate gyroscope is sensitive to rate of rotation about the roll axis. The accelerometer is adapted to accurately measure the steady state tilt but is unsuited to tracking dynamic changes in tilt. In contrast the rate gyroscope is well suited to tracking dynamic changes though it does not provide information regarding the steady state value of the tilt. By monitoring both gyroscope and accelerometer the microprocessor is able to generate data which accurately tracks roll with good dynamic response.

The software module together with the hardware module form the complete GPS information interpretation and processing system used in the apparatus of the present invention. The software module functionality facilitates not only the precision guidance of the agricultural vehicle, but also the logging of data received from the GPS receiver and internally calculated data. This data may be transmitted back to the base station 87 for future receipt and use in field contour mapping and for driver and agricultural vehicle performance reports.

Figure 8:
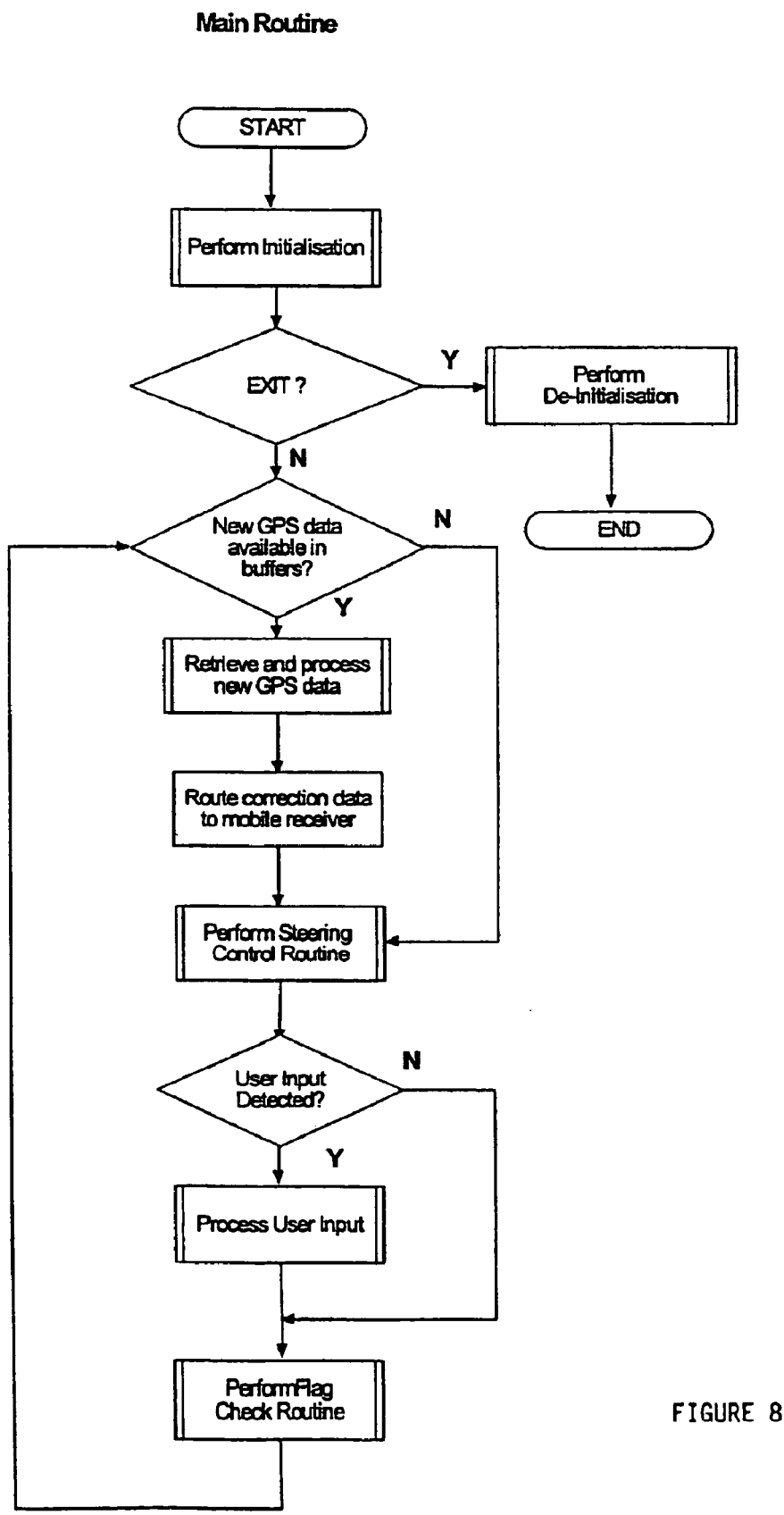
FIGS. 8–21 are flowcharts of a software module for execution by the system of FIG. 2 in one embodiment.
Figure 9:
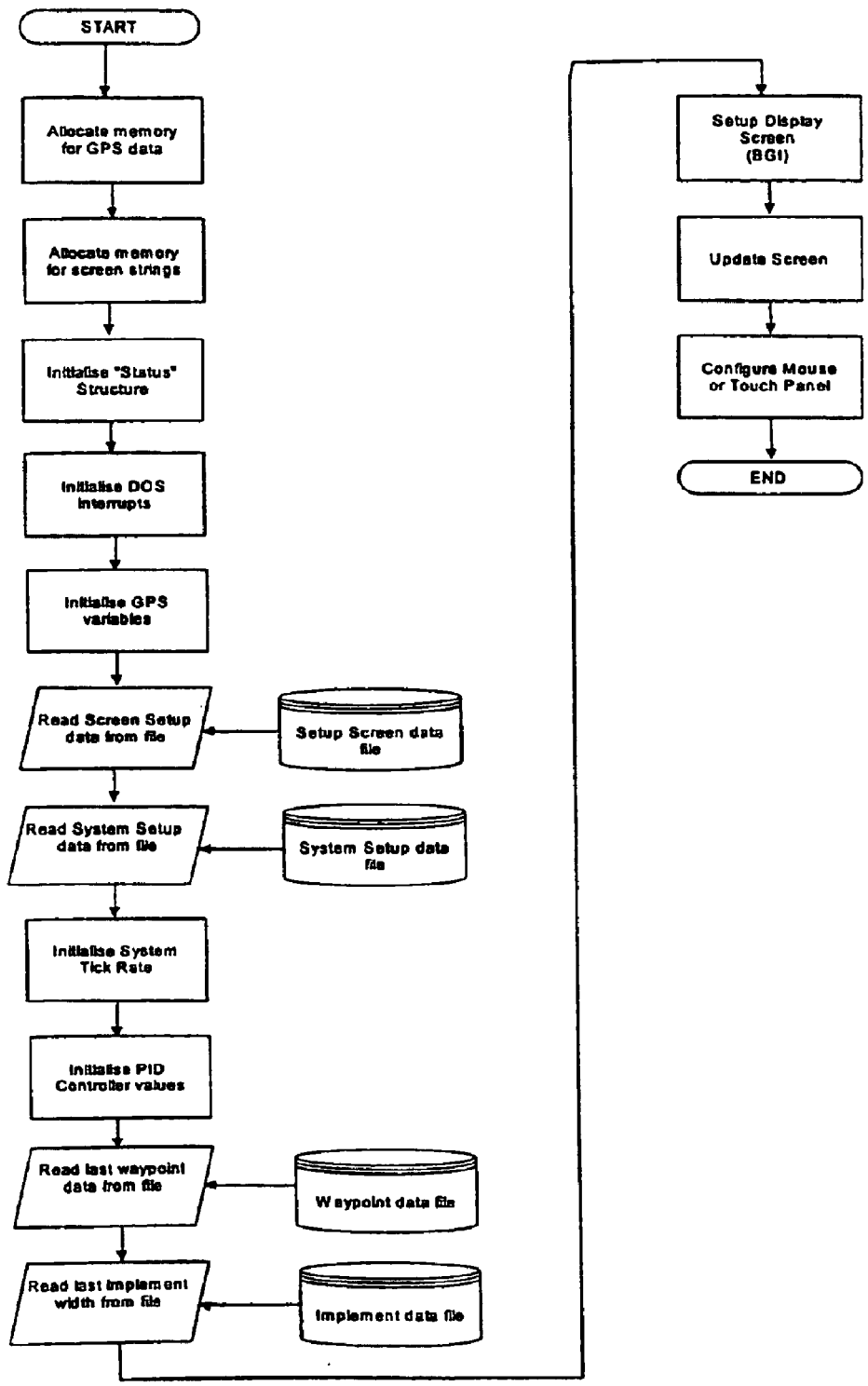
Figure 10:
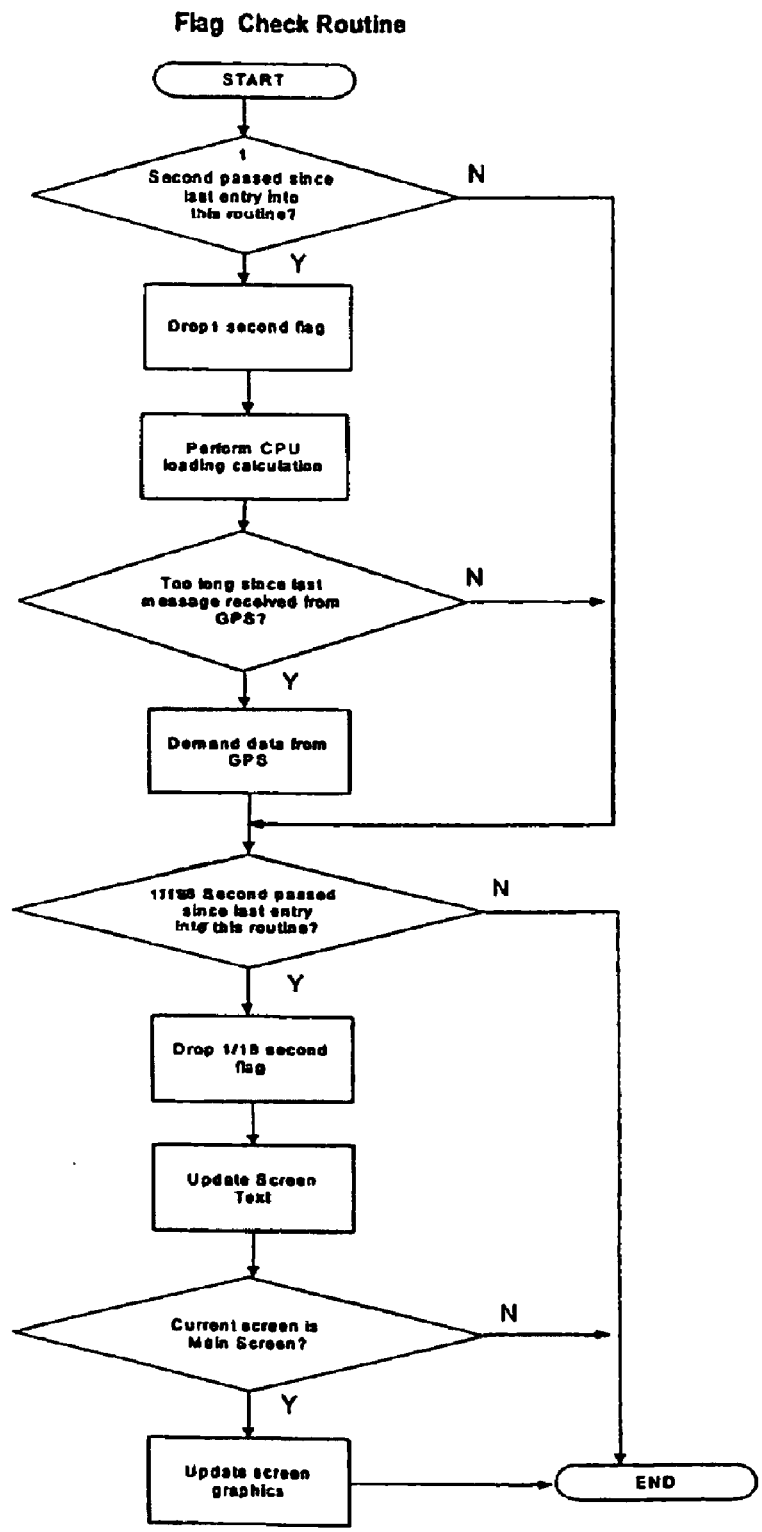
Figure 11:
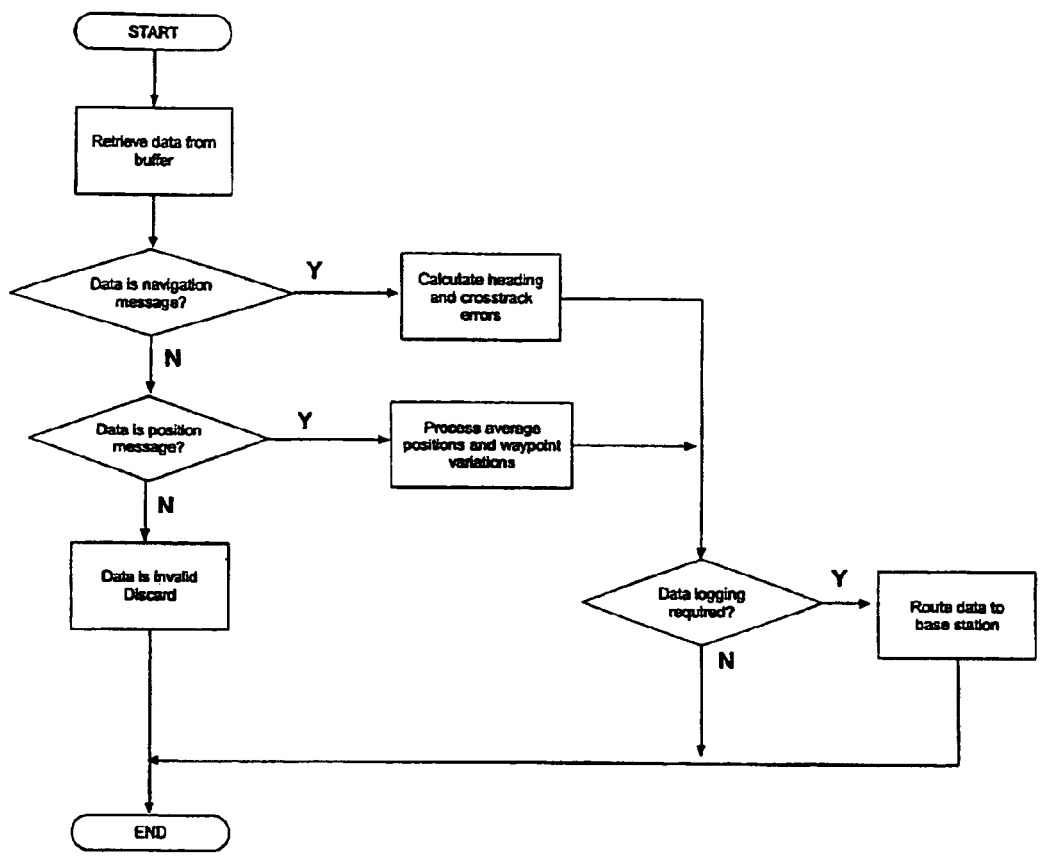
Figure 12:
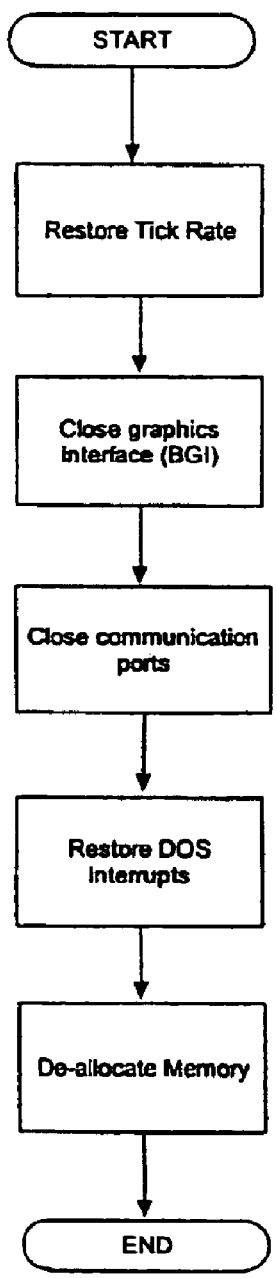
Figure 13:
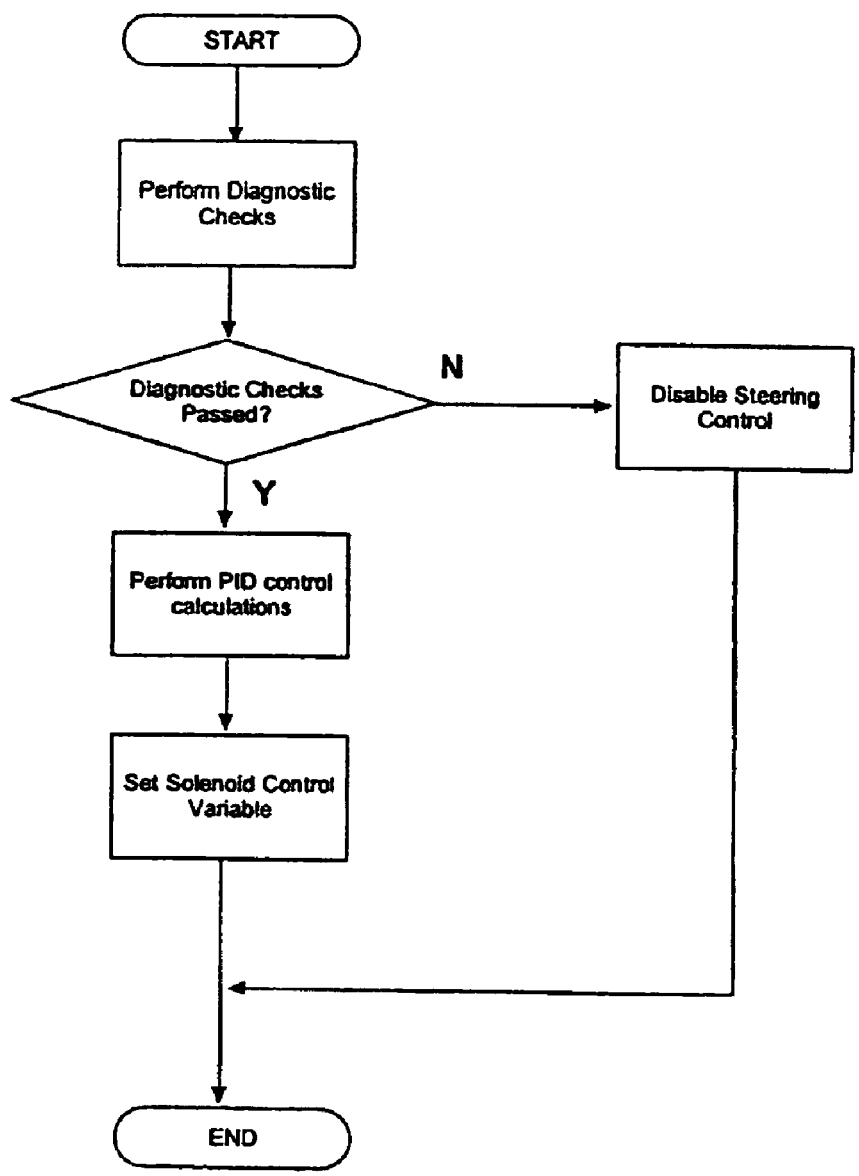
Figure 14:
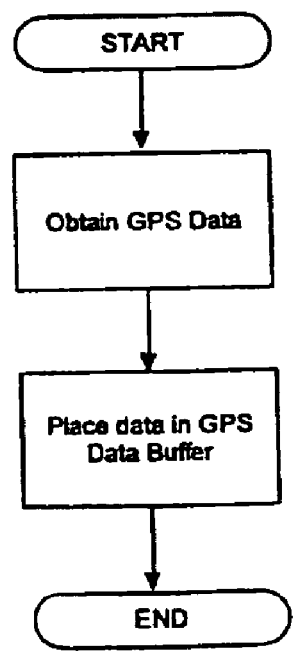
Figure 15:
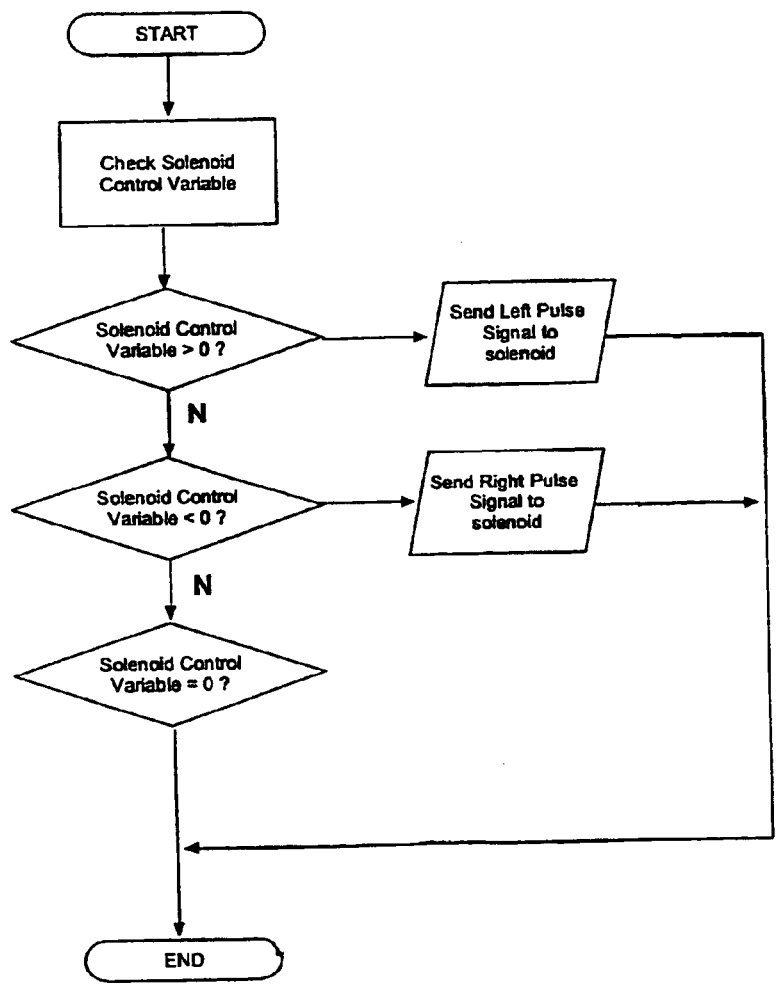
Figure 16:
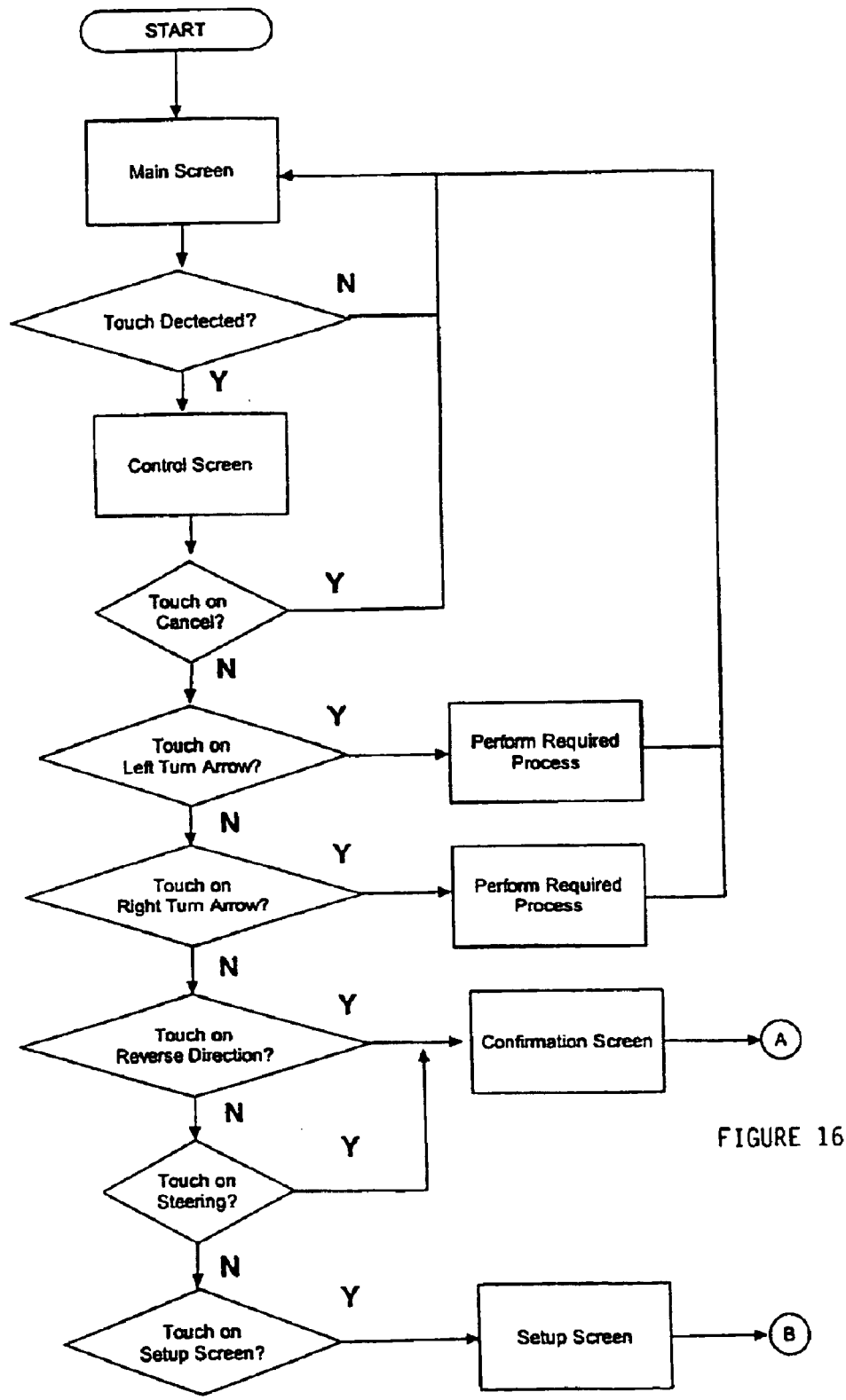
Figure 17:
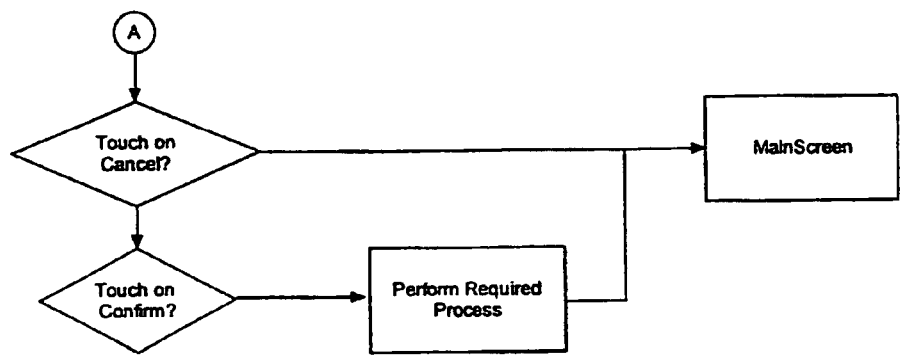
Figure 18:
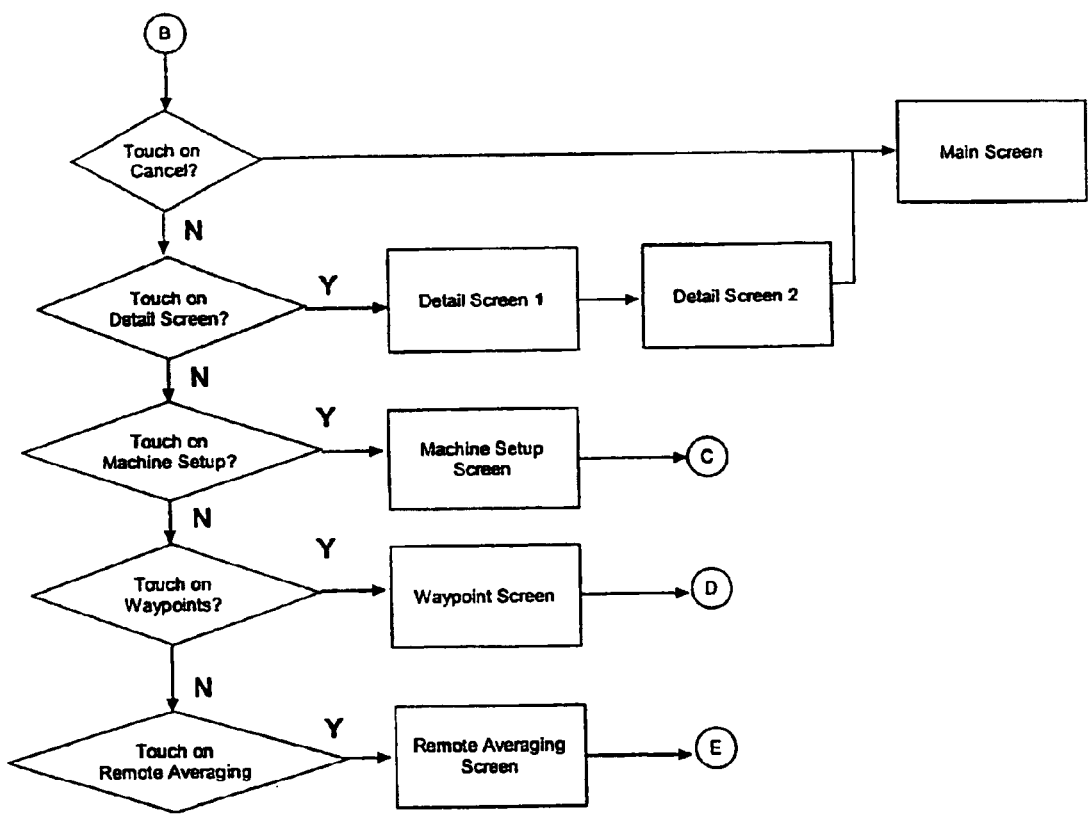
Figure 19:
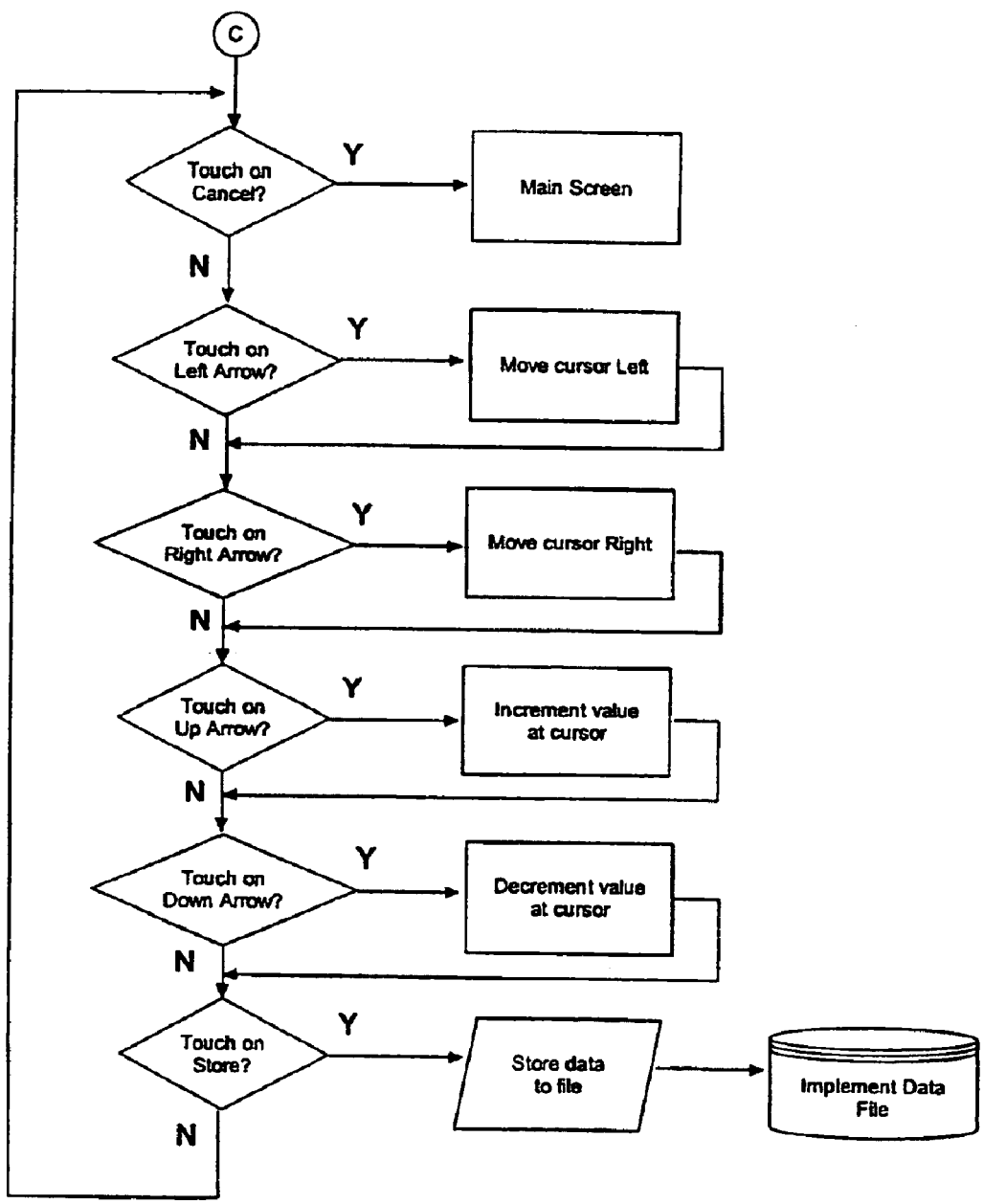
Figure 20:
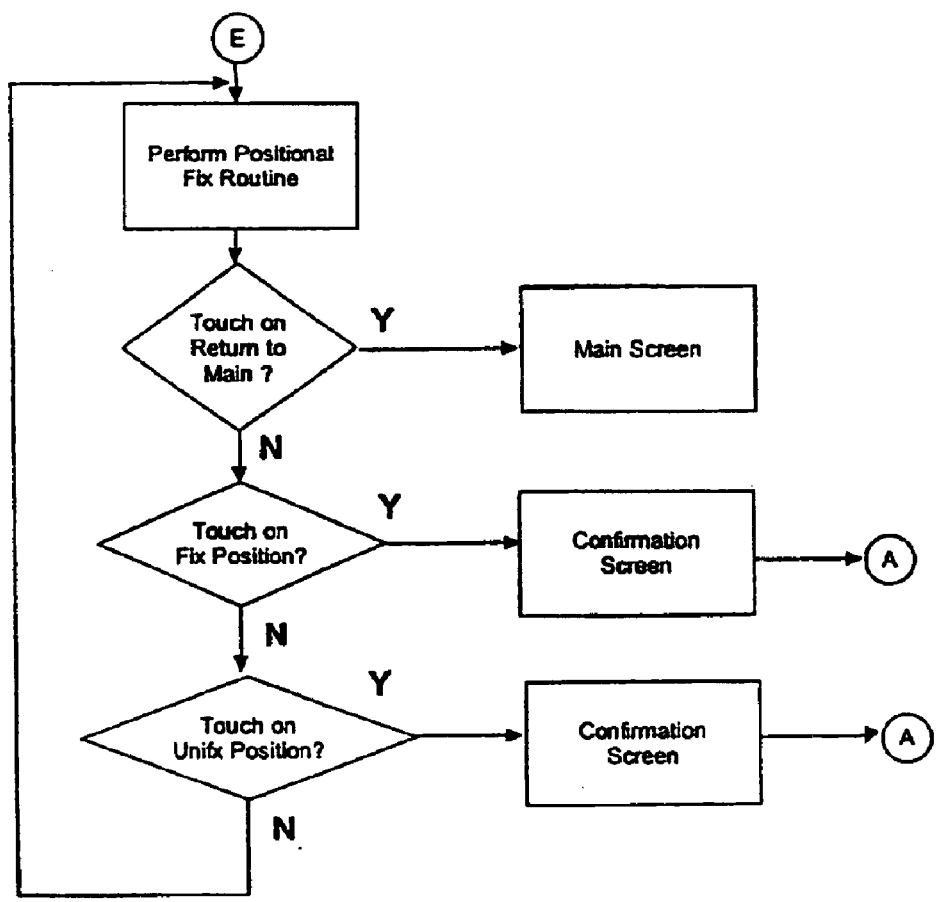
Figure 21:
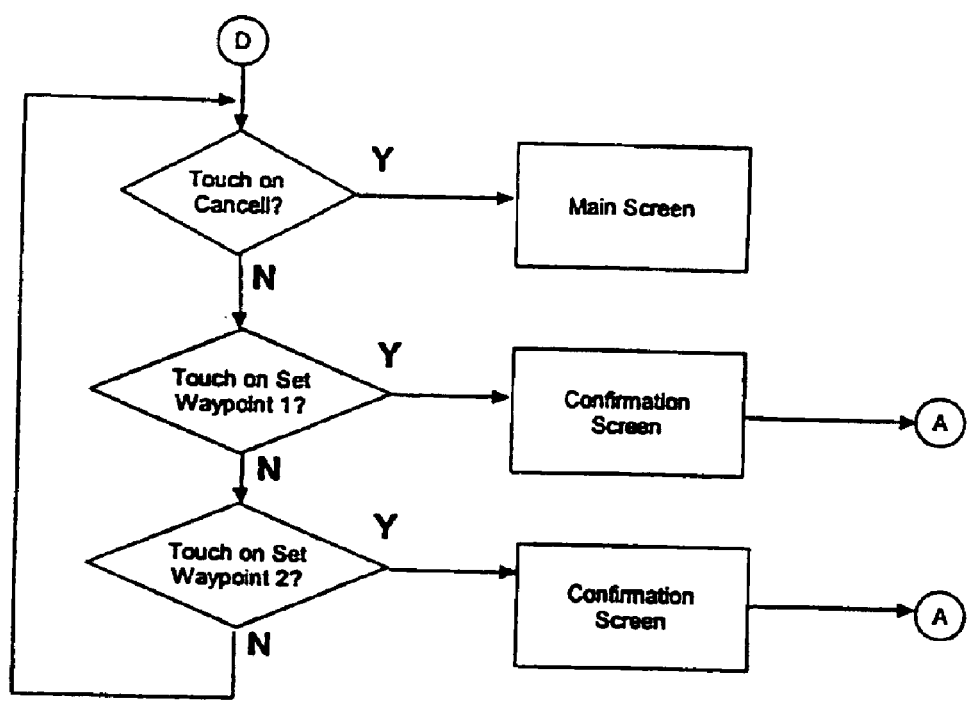

The software module includes a main routine as depicted in FIG. 8. External to this main routine are system interrupts which indicate the receipt of new GPS data or facilitate the execution of time dependent events. The system interrupt routines are depicted in FIGS. 14 and 15.

The user interface for the software module is divided into a series of screens, each relevant to a particular feature or configuration item of the vehicle position apparatus. A process user input routine is displayed in FIGS. 16 to 20 to depict the flow of control between the software module screens.

A user interface main screen provides a number of pieces of textual information to the agricultural vehicle operator, as well as a graphical representation of the current position and heading. The textual information is displayed as a header with an associated value. The headers and their relevance to the operation of the vehicle position apparatus of the preferred embodiment are as follows:

WWHDG-Waypoint Heading is the angle between a line connecting waypoints one and two, and a line connecting waypoint one and true north. This value is useful for navigation purposes.

HDG-Headin is the current heading with respect to true north. this value is useful for navigation purposes.

SLOP-Slop is the current positional uncertainty. the value is in centimeters and reflects the error inherent in the positional value used for navigational calculations.

XTRK-Crosstrack error is the distance from the desired line of travel to the current line of travel. This value is presented in meters.

SATS-This value corresponds to the number of satellites currently in view by the GPS receiver. The vehicle positioning apparatus of the preferred embodiment requires at least four common satellites in view at all times.

CPU-The CPU parameter represents the current loading on the processor board.

CPU-Represents current loading on the GPS receiver.

The vehicle position apparatus of the preferred embodiment contains a diagnostics function which allows operators to ensure that the system is functioning correctly. The diagnostics features are as follows:

Number of Satellites in View at Mobile Unit-as described in SATS above.

CPU Load on GPS Receiver Card-as described in % CPU above.

CPU Load on Local Processor-as described in CPU above.

Number of Satellites in View at Base Unit-This value corresponds to the number of satellites currently in view by the GPS receiver located at the base station. The vehicle positioning apparatus of the preferred embodiment requires at least four common satellites in view at all times.

Rolling Time Update from the GPS Receiver-This constantly changing time value confirms communication with the GPS satellites.

Solenoid Response Test-This test may be performed to ensure the correct operation of the solenoids.

Analogue Input Range Tests-Performed routinely on the applied analogue inputs to alert operators to external device faults.

Radio Communication Continuity Test-Alerts operators to radio device faults.

The mobile unit software module for the vehicle positioning apparatus of the preferred embodiment provides safety mechanisms for the agricultural vehicle operator. The inherent safety of the vehicle positioning apparatus of the preferred embodiment is assured through routines in the software module specifically dedicated to verify correct operation of the system, and to provide mechanisms to inhibit the actions of out of range inputs and outputs. The safety features present in the vehicle positioning apparatus of the preferred embodiment may include the following:

Anomaly: Vehicle position incorrect by a distance of 1 m or more.
Action: Steering Control Outputs disabled.
Effect: Allows agricultural vehicle driver intervention in the case of an emergency.

Anomaly: Wheel angle sensors returning out of range value.
Action: Steering control outputs disabled
Effect: Allows agricultural vehicle driver intervention in the case of an emergency.

Anomaly: Vehicle heading incorrect by an angle of thirty degrees or more.
Action: Steering Control outputs disabled.
Effect: Allows agricultural vehicle driver intervention in the case of an emergency.

Anomaly: Hardware Module unable to set wheel angle to the desired value within four seconds (4sec)
Action: Steering control outputs disabled.
Effect: Allows agricultural vehicle driver intervention in case of an emergency.

Anomaly: Postion uncertainty greater than 50 cm
Action: Steering Control outputs disabled
Effect: Allows agricultural vehicle driver intervention in the case of satellite or receiver down time, or radio data communication lapse.

Anomaly: Velocity of agricultural vehicle less than 0.5 m/s
Action: Steering Control outputs disabled.
Effect: Allows agricultural vehicle to perform necessarily low velocity maneuvers without interruption.

Anomaly: Velocity of agricultural vehicle greater than 5 m/s
Action: Steering Control outputs disabled.
Effect: Allows agricultural vehicle to perform necessarily high velocity maneuvers without interruption.

It will be appreciated by those skilled in theart that the above has been given only by way of illustrative example of the invention and that all such modifications and variations thereto as would be apparent to persons skilled in the art are deemed to fall within the broad scope and ambit of the invention as is herein defined in the appended claims.

What is claimed is:

1. A vehicle guidance apparatus for guiding a land based agricultural vehicle over a paddock along a number of paths, the paths being offset from each other by a predetermined distance, said vehicle including steering means, said apparatus including:

a satellite based global positioning system receiver for periodically receiving vehicle position data and a radio modem operatively receiving positional correction factor data from a base station to correct said periodically received vehicle position data;

inertial relative position determining means mounted to said vehicle, for generating relative positional data along a current path during time periods between receipt of respective said vehicle position data, said relative position determining means comprising a number of accelerometers;

data entry means facilitating entry of an initial path by an operator and a desired offset distance between paths;

processing means coupled to the global positioning system receiver, radio modem and relative position determining means, operatively arranged to generate said paths based on said initial path, said processing means generating a continuous guidance signal indicative of errors in the position of the vehicle relative to one of said paths, with said position being determined by combining the corrected vehicle position data and the relative position data; and controllable steering means coupled to the processing means and selected to guide the vehicle towards said paths thereby reducing said errors.

2. An apparatus according to claim 1, wherein said microprocessor is further operatively arranged to provide an indication of the direction of said vehicle relative to a path closest to said vehicle.

3. An apparatus according to claim 1, wherein said paths are straight parallel lines.

4. An apparatus according to claim 1, wherein said paths are concentric polygons.

5. An apparatus according to claim 1, wherein said controllable steering means includes a human interface for converting said guidance signal to a format indicating said error to a human operator of said vehicle.

6. An apparatus according to claim 1, wherein said controllable steering means includes at least one solenoid mechanically coupled to said steering means, said solenoid responsive to said guidance signal.

7. An apparatus according to claim 6, further including steerage feedback sensors operative to generate steerage feedback signals indicative of orientation of said steerable wheels or tracks, said microprocessor being responsive to said steerage feedback signals.

8. An apparatus according to claim 7, wherein said steerage feedback sensors comprise Hall effect devices.

\* \* \* \* \*

UNITED STATES PATENT AND TRADEMARK OFFICE
CERTIFICATE OF CORRECTION

PATENT NO. : 6,876,920 B1  Page 1 of 1
DATED : April 5, 2005
INVENTOR(S) : Robert Lindsay Mailler It is certified that error appears in the above-identified patent and that said Letters Patent is hereby corrected as shown below:

Title page,
Item [75], Inventor, "Mailer" should be replaced with -- Mailler --.

Column 5,
Line 43, "ad" should be replaced with -- $\Delta$d --.

Column 6,
Line 49, "Is" should be replaced with -- is --.

Column 7,
Line 9, "tractor" should be replaced with -- tractor 5 --.

Column 9,
Line 5, "WWHDG" should be replaced with -- WHDG --.
Line 10, "this" should be replaced with -- This --.
Line 25, "CPU" should be replaced with -- %CPU --.

Signed and Sealed this

Ninth Day of August, 2005

JON W. DUDAS
*Director of the United States Patent and Trademark Office*